May 24, 1955  H. R. SEELEN  2,708,774
MULTIPLE GLAZED UNIT
Filed Nov. 29, 1949
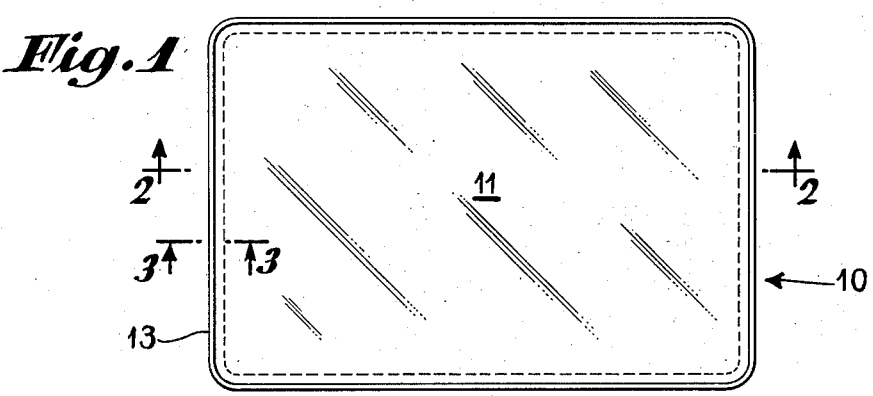
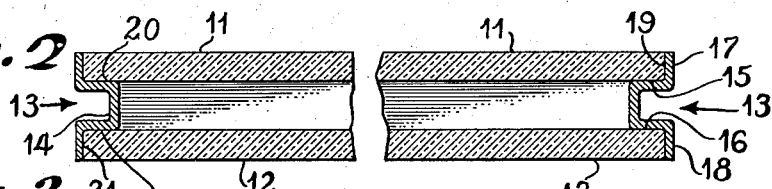
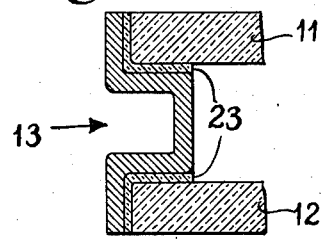 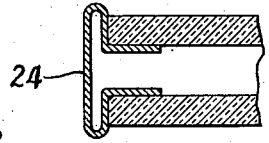 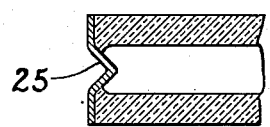
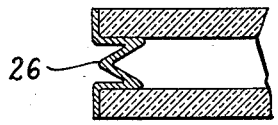 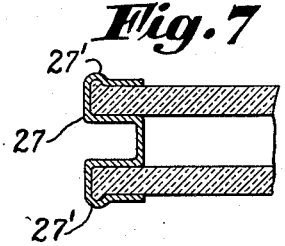 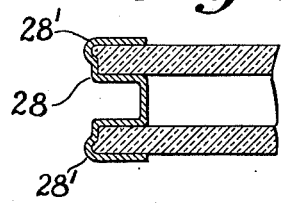
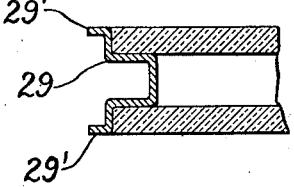 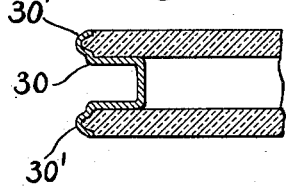
INVENTOR
HARRY R. SEELEN
BY
William A. Zalesak
ATTORNEY United States Patent Office 2,708,774
Patented May 24, 1955

2,708,774

MULTIPLE GLAZED UNIT

Harry R. Seelen, Lancaster, Pa., assignor to Radio Corporation of America, a corporation of Delaware Application November 29, 1949, Serial No. 129,957

10 Claims. (Cl. 20—56.5)

My invention relates to window construction and more particularly, though not exclusively to a multiple glazed construction useful in buildings, vehicles, show cases and for other purposes.

It has long been sought to make a satisfactory multiple glazed insulation unit wherein at least two panes of glass are held spaced from each other and bonded together in an air-tight manner. In view of the cost of such units and the high cost of the constructions into which they are more or less permanently installed, such units, to be satisfactory, must have a relatively long useful life. Such units have heretofore been unsatisfactory primarily because of failure of the air-tight bond between the panes, inability to withstand physical and thermal shock as well as for other reasons. One type of such unit is constructed with a spacer between two adjacent surfaces of glass panes and near their outer edges with a plastic material covering the edge of the assembly to prevent the entrance of air and moisture. According to another construction two adjacent surfaces each have a ribbon-like metallic deposit near the outer edge thereof to which is soft-soldered a metallic spacer. In still another type of unit one pane is sealed to the other by means of a glass-to-glass fusion seal. According to yet another type of construction a U-shaped metal alloy spacer of the same coefficient of expansion as the glass is hermetically sealed to each pane along the opposing edge portions thereof with or without an intermediate frit.

Of necessity such units are large and involve large seals in view of the purpose for which they are intended, units having an area of one square foot or somewhat less being the smallest that are practical while considerably larger units are particularly desirable. Though the units manufactured heretofore employing glass-to-metal sealing techniques have proven to be the most satisfactory available, such units have been extremely costly and had relatively short life. Though it is now possible to make glass-to-metal seals of relatively small area in a high speed manner and even larger seals where the components are circular or cylindric, the size and rectangular shape of multiple glazed units as well as the requirement that the glass elements must be substantially free from distortion have to date made their manufacture extremely difficult and costly without providing a satisfactory product.

I have found that the foregoing shortcomings may be eliminated and that such units may be improved in all respects in accordance with my invention.

It is, therefore, a principal object of my invention to provide a multiple glazed unit permanently bonded in an air-tight manner and having high resistance to thermal and physical shock.

Another object of my invention is the provision of a window construction unit wherein a metallic frame member is hermetically sealed to a glass member in two or more planes to provide a long seal path and wherein such a unit is provided with rounded corners.

Still another object is the provision of such a device wherein a metallic frame member is hermetically bonded to each glass element by means of a compression type seal.

Yet another object is the provision of such a unit having multiple glass panes bonded together in an air-tight manner by means of a frame member in such manner that one pane may move independently of the other without fracture of the glass or destruction of the air-tight seal occurring.

A further object is the provision of such a window construction unit wherein a metallic frame member having a coefficient of expansion substantially greater than the glass is hermetically bonded thereto by means of a low working temperature glass frit in a compression type seal.

In carrying out my invention, I provide a frame member in the form of a continuous flexible band which is rigidly sealed by a non-metallic glass-to-metal seal to a sheet glass element along two or more planes, preferably by means of a compression type seal. At least one of the planes selected includes the peripheral edge or minor surface of the glass element. The frame member is preferably of a metal alloy having a coefficient of expansion greater than that of the glass and is bonded thereto in a compression type seal. The portion of the frame member which is not directly bonded thereto is substantially flexible.

The novel features which I believe to be characteristic of my invention are set forth with particularity in the appended claims, but the invention itself will best be understood by reference to the following description taken in connection with the accompanying drawing, in which:

Figure 1 is a plan view of a multiple glazed window unit according to my invention;

Figure 2 is a sectional view thereof through the line 2—2 of Figure 1 on an enlarged scale;

Figure 3 is a sectional view thereof along the line 3—3 of Figure 1 on a still further enlarged scale;

Figures 4 to 10 inclusive are fragmentary sectional views on the scale of Figure 2 of various embodiments also constructed in accordance with my invention.

Referring now to the drawing and to Figures 1, 2 and 3 in particular, a multiple glazed unit 10 has two sheet elements or panes of glass 11, 12 alined substantially in parallel relation and sealed vacuum tight to an endless frame member 13. Through unit 10 is shown and described as having two sheet glass elements it is obvious that the number may be varied as desired without departing from the scope of my invention. By extending frame member 13 downward (Figure 2) and duplicating the shape shown, provision may readily be made for additional glass elements.

I preferably utilize metallic frame member 13 having flexible spacing web 14, lands 15, 16 and wings 17, 18. In fabrication glass element 11 is sealed vacuum tight not only to land 15 but also to wing 17. Such a frame member construction which provides surfaces in two planes for sealing to the glass element is an important feature of my invention. The vacuum tight glass-to-metal seal provided extends along the peripheral edge or minor surface 19 of glass element 11 and continues along a portion 20 of the inner major surface thereof. Similarly, the vacuum tight glass-to-metal seal between the metallic frame member and glass element 12 extends continuously along the peripheral or minor surface 21 and along a portion 22 of the inner major surface thereof. An immediate advantage of my construction is the provision of long seal paths thus providing greater protection against entrance of air and moisture into the space between the glass elements. As will be hereinafter pointed out still further advantages accrue from my construction which simplify the manufacture thereof and at a cost per unit considerably below that heretofore considered attainable.

Unit 10 may be manufactured in accordance with well known glass-to-metal sealing techniques employed heretofore in the art. That is, glass elements 11, 12 and metallic frame member 13 may have matching and substantially equivalent temperature coefficients of expansion in the desired temperature range. Such a construction has enhanced strength and longer life over similar units heretofore manufactured.

Another feature of my invention, and one which is rendered possible by reason of the outside type of vacuum tight seal between the frame member and the sheet glass elements, is that the seal is effected in such manner that the glass surfaces are under a substantial compressive force thereby adding great strength to the assembly. Thus, where, as described hereinabove, the glass and metallic members have the same temperature coefficients of expansion, I provide a strong vacuum tight seal between the glass and metal in which the surfaces of the glass elements are under compression by allowing the glass at sealing temperature to redistribute itself in the seal area and then cool down to about its setting temperature while maintaining the metallic frame member at a higher temperature by selective heat treatment. I then allow the glass and metallic members to cool down in accordance with well known techniques in order to shrink the metallic member onto the glass element or elements and form a compression seal between said member and said elements.

Since the glass elements are held under compression by the tension produced in the frame member when that member is shrunk onto the glass elements, it may be said that the frame is biased, or under tension, in the same sense that a spring may be biased. That is, both the biased spring and the biased frame member possess potential energy.

I have found that such a system is not as readily controlled or as adaptable to high speed mass production methods as one in which the metallic frame member, instead of having a coefficient of expansion which is the same as the glass elements, has a coefficient of expansion greater than the glass elements. Here again the metallic member may be sealed directly to the glass elements; the glass and metallic members being allowed to cool in equilibrium after the glass has been re-distributed in the seal area.

Thus, in accordance with another feature of my invention I employ a metallic member having a temperature coefficient of expansion greater than that of the glass elements. In addition I also preferably use a glass frit 23 (Figure 3) intermediate the glass elements 11, 12 and metallic frame member 13 which has a lower softening point than that of the glass elements. In the drawing, and in particular in Figure 3 thereof the dimensions of the various members and in particular the boundaries therebetween have been greatly exaggerated for the purpose of clarity. Actually, in view of an adherent oxide formed on the metal which is readily fusible with the glass or frit, the boundaries would not be so distinct when viewed in cross-section.

Though any one of various methods may be employed in manufacturing window construction units embodying the present invention exceptional advantages are provided if the method employed is in accordance with that disclosed and claimed in the copending joint application of W. E. Anthony and myself (RCA 31,658) filed November 28, 1952, Serial Number 323,018. In accordance with the method therein disclosed the preformed metallic frame member is pre-oxidized in a slightly oxidizing atmosphere of 10 per cent hydrogen and 90 per cent nitrogen having a dew point of approximately −35 degrees C. I preferably employ a nickel-iron alloy containing 48–51 per cent nickel and the remainder substantially iron in forming the metallic frame member on which a tightly adherent grey oxide forms during the step of pre-oxidation. The frame member has a temperature coefficient of expansion between 25 degrees C.–300 degrees C. of approximately $(85-96) \times 10^{-7}$ in./in./degree C. The frame is sprayed with a frit suspension in which the frit has a theoretical composition of about 70 per cent lead oxide (PbO), about 15 per cent boric oxide ($B_2O_3$) and about 15 per cent silica ($SiO_2$) and an expansivity (25 degrees–300 degrees C.) of approximately $(75-76) \times 10^{-7}$ in./in./degree C. and then fired in a slightly oxidizing controlled atmosphere to pre-glaze the frame. In preparing the glass sheet elements 11 and 12 for the sealing operation the usual corners are ground and rounded off to fit the frame member which also is formed with rounded corners to eliminate the building up of undue stress concentrations which would otherwise result. Frit putty 23 is applied to the glazed frame member in the areas of the wings 17 and 18 and lands 15 and 16. The unit is then assembled and sealed. The glass elements utilized have a temperature coefficient of expansion (25 degrees–300 degrees C.) of approximately $(82-84) \times 10^{-7}$ in./in./degree C. During sealing the assembly is pre-heated to and equalized at approximately 515 degrees C. and then the temperature is raised by R. F. power or flame until the frame wings 17 and 18 have reached approximately 750 degrees C. The heating causes the frame 13 to expand away from the glass edge and the frit to sinter and wet the pre-glazed surface of the sealing land, and the contacting surface of the glass elements. As soon as liquefaction of the frit is complete, the frame 13 is allowed to cool and it contracts rapidly squeezing the frit glass 23 until it fills the interstices between the frame wing and peripheral glass surfaces. These glass surfaces are heated sufficiently by radiation and conduction so that good wetting thereof by the frit occurs. The sealed unit is then equalized at approximately 540 degrees C. to release strains in the glass elements caused by rapid cooling from the sealing temperature. Inasmuch as the metallic frame member and the glass element are separated by the frit while it is still fluid, no further stress is applied to the glass elements until the frit begins to solidify. The setting point of the frit varies with the rate at which it is cooled and the conditions under which the cooling is effected. However, a setting temperature of approximately 375 degrees–425 degrees C. has proven satisfactory. Finally, the unit is annealed and cooled to room temperature in such manner that the glass surfaces are maintained in compression.

The metallic frame member 13 is formed with an aperture (not shown) through the web 14 which permits flushing the sealed unit and filling with the desired atmosphere upon which the aperture is sealed with solder.

When additionally improved flexibility between the glass elements or more rigidly or strength in the seal areas is desired I utilize a frame construction illustrated in Figures 4 through 10 or a composite of two or more. In Figures 4, 5 and 6, frame members 24, 25, 26 have additional advantages of increased flexibility and ability to absorb thermal and physical shock and prevent the transference of the same from one sheet glass element to another. In Figures 7, 8, 9 and 10, frame members 27, 28, 29 and 30 exemplify constructions in which the seal system is strengthened and rigidified while the spacing web permits the desired flexibility between the opposing glass sheet elements. Frame members 27, 28 and 30 are provided with beads 27', 28' and 30', respectively, while frame member 29 is provided with peripheral flanges 29'.

A window construction unit made in accordance with my invention is found to be extremely rugged. The frame member so protects the glass elements and the compression seal renders the same so strong that such units are capable of withstanding considerable thermal and physical shock without failure. For example, units impacted by dropping from a height of 6 feet onto hard wood showed no signs of failure while substantially greater impact merely resulted in chipping of the edges, without affecting the soundness of the seal.

Other specific materials than those described hereinabove may be utilized in carrying out my invention but the maximum stress in the window glass commercially available at present should not exceed 1.0 kg./mm.$^2$ compression. From units made in which the expansion of the frame member ranged between 85 and 100×10$^{-7}$, that of the window glasses ranged from between 82 and 94×10$^{-7}$, and that of the intermediate frits ranged from between 75 and 84×10$^{-7}$ (all expansivities between 25 degrees–300 degrees C.) the materials which give uniformly successful results are those the coefficients of expansion of which bear the following certain relation. The frit should have a coefficient of expansion from 25 degrees C. to its setting point substantially 3–4.0×10$^{-7}$ higher than that of the window glass over the same temperature range; the window glass having a higher setting point as pointed out hereinabove. The coefficient of expansion of the frame member should be from 6–12×10$^{-7}$ higher than that of the window glass. Though any commercially available materials may be used it is to be understood that those used have the desired properties and may be successfully sealed in accordance with good sealing practice.

Whether the metal frame is sealed to the glass sheets directly or by means of an intermediate glass frit, as described herein, the seal between the frame and the glass is non-metallic, that is, it does not involve any layer of metal between the frame and the glass.

While several embodiments of my invention have been shown and described, it will be understood that various changes and modifications may be made therein without departing from the spirit and scope of the invention.

I claim:

1. A multiple glazed unit, comprising a plurality of sheet glass elements each having a pair of parallel surfaces joined by a peripheral surface, an endless metallic frame member comprising a web portion intermediate said glass elements, land portions each integral with opposite ends of the web portion and sealed vacuum tight to opposing inner surface portions of said sheet glass elements by a non-metallic glass-to-metal seal, and wing portions one integral with each of said land portions and sealed vacuum tight to each of said sheet glass elements along the peripheral surface thereof by a non-metallic glass-to-metal seal, said metallic frame member maintaining said sheet glass elements in spaced-apart relation.

2. A multiple glazed unit as described in claim 1 wherein each of said wing portions has an endless bead formed therein adjacent the periphery thereof sealed to one of said glass elements with glass extending into and sealed in said bead.

3. A multiple glazed unit as described in claim 1 wherein each of said wing portions has a portion thereof extending substantially parallel to the opposed surfaces of said glass elements.

4. A multiple glazed unit as described in claim 3 wherein the parallel extending portion of each of the wing portions extends along a portion of the surface of one of said glass elements opposite that sealed to said land portion and is glass-to-metal sealed thereto.

5. A multiple glazed unit, comprising a plurality of sheet glass elements each having a pair of parallel surfaces joined by a peripheral surface, an endless metallic frame member comprising a web portion intermediate said glass elements, land portions each integral with opposite ends of the web portion and sealed vacuum tight to opposing inner surface portions of said sheet glass elements by a non-metallic glass-to-metal seal, and wing portions one integral with each of said land portions and sealed vacuum tight to each of said sheet glass elements along the peripheral surface thereof by a non-metallic glass-to-metal seal, said metallic frame member maintaining said sheet glass elements in spaced-apart relation having forces stored therein biasing the same to maintain said sheet glass elements in compression over a wide range of temperature.

6. A multiple glazed unit as described in claim 5 wherein said glass-to-metal seals have a softening temperature substantially below the softening temperature of said glass elements.

7. A multiple glazed unit as described in claim 5 wherein said glass elements have a predetermined coefficient of expansion, and said metallic frame member has a coefficient of expansion greater than that of said sheet glass elements.

8. A multiple glazed unit as described in claim 7 wherein said metallic frame member is sealed to said glass elements by a frit having a softening temperature substantially below the softening temperature of said glass elements.

9. A multiple glazed unit as described in claim 5 wherein each of said wing portions has an endless bead formed therein adjacent the periphery thereof sealed to one of said glass elements with glass extending into and sealed to said bead.

10. A multiple glazed unit as described in claim 5 wherein each of said wing portions has a portion thereof extending substantially parallel to the opposed surfaces of said glass elements.

References Cited in the file of this patent
UNITED STATES PATENTS

| Number | Name | Date |
|---|---|---|
| 1,184,813 | Birdsall | May 30, 1916 |
| 1,988,964 | Barrows | Jan. 22, 1935 |
| 2,122,453 | Clause | July 5, 1938 |
| 2,235,680 | Haven et al. | Mar. 18, 1941 |
| 2,348,297 | Huddle | May 9, 1944 |
| 2,348,307 | Richardson | May 9, 1944 |
| 2,509,906 | Clark et al. | May 30, 1950 |
| 2,589,064 | Drake | Mar. 11, 1952 |